United States Patent
Lenell et al.

(10) Patent No.: US 7,099,752 B1
(45) Date of Patent: Aug. 29, 2006

(54) SAFELANDER

(76) Inventors: Leslie Jae Lenell, 4928 Maytime La., Culver City, CA (US) 90230; Seymour Levine, 4928 Maytime La., Culver City, CA (US) 90230

( * ) Notice: Subject to any disclaimer, the term of this patent is extended or adjusted under 35 U.S.C. 154(b) by 0 days.

(21) Appl. No.: 10/822,271

(22) Filed: Apr. 10, 2004

Related U.S. Application Data

(60) Provisional application No. 60/514,669, filed on Oct. 27, 2003.

(51) Int. Cl.
*B64C 1/00* (2006.01)

(52) U.S. Cl. .............................. 701/2; 701/3; 244/189; 340/945

(58) Field of Classification Search .................... 701/9, 701/15, 29, 14, 35, 120, 2, 24, 3, 16; 434/37, 434/38, 43, 44, 69, 30, 55, 58; 345/771; 340/945, 574, 426.1, 573.1, 853.2; 244/189, 244/190, 118.5, 75 R; 348/114
See application file for complete search history.

(56) References Cited

U.S. PATENT DOCUMENTS

| | | | | |
|---|---|---|---|---|
| 4,964,598 A | | 10/1990 | Berejik et al. ............... 244/190 |
| 5,067,674 A | | 11/1991 | Heyche et al. ............... 244/190 |
| 5,137,450 A | * | 8/1992 | Thomas ........................ 434/44 |
| 5,582,518 A | * | 12/1996 | Henique et al. ............... 434/44 |
| 5,771,181 A | * | 6/1998 | Moore et al. .................... 703/7 |
| 5,890,079 A | | 3/1999 | Levine ........................... 701/14 |
| 5,904,724 A | * | 5/1999 | Margolin ..................... 701/120 |
| 5,974,349 A | | 10/1999 | Levine ........................... 701/29 |
| 6,234,799 B1 | * | 5/2001 | Lin ............................... 434/30 |
| 6,283,758 B1 | * | 9/2001 | Waller .......................... 434/44 |
| 6,634,885 B1 | * | 10/2003 | Hodgetts et al. .............. 434/55 |
| 2002/0087296 A1 | * | 7/2002 | Wynn ............................ 703/8 |
| 2003/0127557 A1 | * | 7/2003 | Anderson et al. ........... 244/1 R |
| 2003/0190589 A1 | * | 10/2003 | Lechner ........................ 434/43 |
| 2003/0194683 A1 | * | 10/2003 | Vorst ............................ 434/38 |
| 2004/0078122 A1 | * | 4/2004 | Pippenger ..................... 701/3 |
| 2004/0107027 A1 | * | 6/2004 | Boudrieau .................... 701/1 |

OTHER PUBLICATIONS

Levine, Seymour (SY) "Crashes Into the Pentagon & WTC Were Preventable" Oct. 6 & 7, 2001, pp. 5, 6, 7 & 26.

(Continued)

*Primary Examiner*—Richard M. Gamby
*Assistant Examiner*—Tuan C To

(57) ABSTRACT

SAFELANDER provides a method of safely operating aircraft, equipped with a Flight Control Unit, Instrument Landing System, and Autopilot, remotely on the ground and/or in congested airspace. The remote pilot, who can concurrently control a plurality of operational aircraft, communicates with Air Traffic Control and operates in a secure, synthetic vision, high fidelity, virtual reality cockpit simulator located in a ground-based facility. The patent saves cost and weight by providing a method for safely piloting traditionally dual piloted operational aircraft with just a single onboard pilot. The invention protects aircraft, edifices and the population from pilot error and/or terrorists. Decreases cost of air travel. Quickly, safely and effectively responds to emergencies. Increases flight safety and security. SAFELANDER ciphers and utilizes the two-way RF ground to aircraft and aircraft to ground telecommunication links and critical aircraft flight control data of U.S. Pat. No. 5,974,349, "Remote, Aircraft, Global Paperless Maintenance System".

36 Claims, 4 Drawing Sheets

OTHER PUBLICATIONS

Levine, Seymour (SY) "The Remote Flight Recorder & Telemetry System can Substantially Air Accidents While Enhancing Air Space Capacity, Operational Efficiency and Aircraft Security" Nov. 17, 2000, pp. 5, 6, 7, 22, 23, 30, 31, 33, 34.

Levine, Seymour (SY) "The Remote Flight Recorder and Advisory Telemetry System and its Ability to Reduce Fatal Air Accidents by 78%" May 3-5, 1999 pp. 248, 249, 250, 251, 259, 260, 261, 268, & 270.

* cited by examiner

FIG. 1 SAFELANDER COMMUNICATION SYSTEM

FIG. 3 CENTRAL GROUND-BASED PROCESSING STATION (CGBS)

SAFELANDER

PRIORITY

This patent is based on, and claims priority over, Provisional Patent: SAFELANDER, Ser. No. 60/514,669, Filing Date: Oct. 27, 2003, Express Mail Label No.: EU181405482US, by Leslie Jae Lenell and Seymour Levine.

CROSS-REFERENCE TO RELATED APPLICATIONS

None.

FEDERALLY SPONSORED RESEARCH

None.

SEQUENCE LISTING

None.

REFERENCES CITED

U.S. PATENT DOCUMENTS

| NUMBER | DATE | CLASS |
| --- | --- | --- |
| 5,890,079 | Mar. 30, 1999 | 701/14 |
| 5,974,349 | Oct. 26, 1999 | 701/29 |
| 5,067,674 | Nov. 26, 1991 | 244/190 |
| 4,964,598 | Oct. 23, 1990 | 244/190 |

BACKGROUND

This invention relates to a remote pilot, located on the ground in a high fidelity virtual reality simulator, taking control of a civilian or military aircraft such as:
a) Executive (small to medium sized) Aircraft
b) Passenger/Carrier Aircraft
c) Cargo Aircraft
in order to provide relief to the aircraft's pilot(s) or to facilitate a safe landing which minimizes the loss of life and property damage from an aircraft that deviates from its air traffic control approved safe trajectory and/or approved flight plan.

Situations arise where an aircraft is piloted in such a way as to put the public in harms way. This can occur from a rogue pilot(s), terrorist(s), and/or problems aboard the aircraft that renders the flight crew incapable of safely piloting the aircraft (e.g.: sudden decompression). An example of the above was the aircraft hijacking that occurred on Sep. 11, 2001 where two commercial carrier aircraft were steered into the World Trade Center, another commercial carrier aircraft into the Pentagon and a fourth commercial carrier crashed in Pennsylvania, when its passengers attempted to take control away from the hijackers. Under the 9/11 scenario, with SAFELANDER'S remote pilot(s) located on the ground and using ciphered telemetry, the planes would be piloted away from large metropolitan areas and safely landed at airfields that minimizes the loss of life to both the persons aboard the aircraft and those located on the ground. Although SAFELANDER potentially wouldn't save all lives, it would substantially reduce the fatality count. SAFELANDER also acts as an effective deterrent to aircraft hijacking, since it eliminates the hijackers' ability to inflict a large number of ground deaths and/or destroy significant edifices.

A substantial economic benefit of this invention is to reduce the cost of flying by permitting a single pilot aboard Executive Aircraft, Passenger/Carrier Aircraft, Cargo Aircraft and large Military Aircraft. These aircraft traditionally have had two pilots in the flight crew (i.e.: pilot and copilot). With the advent of modern telemetry, communication, high fidelity virtual reality simulation, autopilot and the instrument landing system, an aircraft can be safely piloted with just a single onboard pilot and the use of a remote pilot located in a ground-based high fidelity virtual reality aircraft cockpit simulator.

The remote pilot:
I. provides relief to the onboard pilot and/or handles emergencies should the aircraft's pilot become disabled;
II. is an experienced licensed pilot who is highly trained in the handling of emergency procedures and landings of the specific type(s) of aircraft;
III. is provided with the ability to communicate in real-time with the air traffic control, manufacturer, security, and air carrier personnel in order to provide the safest conning/guiding and landing of an aircraft;
IV. can concurrently and safely control a plurality of aircraft.

U.S. Pat. Nos. 5,890,079 and 5,974,349 provide the means for the transmittal of flight recorder information to a Central Ground-Based Processing Station. This information in real-time contains the critical operational aircraft data that is mandatory for replicating the flight conditions at a secure high fidelity virtual reality remote pilot ground-based simulator. Also, U.S. Pat. Nos. 5,890,079 and 5,974,349 establish the mandatory real-time two-way radio frequency (RF) telemetry (aircraft to ground and ground to aircraft) communication capability with Air Traffic Control/Management (ATC/M). Yet the above-cited patents don't have the onboard aircraft electronic interfaces necessary to enable the remote piloting of an aircraft. Nor do they provide a high fidelity virtual reality secure aircraft cockpit simulator necessary for safely remote piloting an operational aircraft in congested airspace.

U.S. Pat. No. 5,067,674 mixes video data taken from an aircraft with terrain data taken from a database to project a three-dimensional display of the aircraft to a remotely located pilot. This patent only utilizes a small subset of the needed data to safely control a commercial carrier aircraft in a highly congested air space or during taxiing on the ground. The patent also doesn't provide a means where a single remote pilot can concurrently control a plurality of aircraft.

U.S. Pat. No. 4,964,598 also deals with the apparatus for controlling an aircraft, particularly remotely controlled aircraft. This transmits some critical flight control data of the aircraft to a remote located pilot who controls the aircraft and has the ability to transmit some critical control data to the aircraft for controlling it. The patent doesn't provide the necessary safeguards to control a carrier aircraft on the ground or in a congested air space. Nor does U.S. Pat. No. 4,964,598 provide for a single remote pilot safely and concurrently controlling a plurality of aircraft.

None of the above cited patents provide the necessary safeguards for the remote control of large commercial and/or military aircraft, which presently utilize two pilots (pilot/ copilot), operating in heavily congested civilian air space and at airports. What is needed is a remote pilot capability that provides the safeguards to enhance aviation safety to a level that not only increases the safety of the passengers onboard an aircraft but also enhances the safety of persons on the ground and protects significant edifices from pilot error and/or terrorism.

In conclusion, insofar as the patent applicants are concerned, no other aircraft remote pilot capability formerly developed provides the necessary safeguards and capabilities to allow the dynamic transfer of the piloting function between the onboard pilot(s) and the ground-based remote pilot(s) for the control of Executive (small to medium sized) Aircraft, Passenger/Carrier Aircraft, Cargo Aircraft and large Military Aircraft. SAFELANDER permits aircraft, such as the above, to be operated remotely and safely in highly congested airspace. It also permits these aircraft to be safely piloted by a single onboard pilot should that mode of operation be selected. SAFELANDER substantially reduces the cost of flying and the cost of providing national and aviation security while enhancing aviation safety.

SUMMARY

The invention permits the safe landing of an aircraft equipped with a flight control unit, instrument landing system and autopilot by a remote pilot, located on the ground in a high fidelity virtual reality simulator. The invention has significant cost, security and safety advantages over the present method of controlling large Military, Executive (small to medium sized) Aircraft, Passenger/Carrier Aircraft, and Cargo Aircraft. It saves the cost of putting armed sky-marshals aboard commercial aircraft, eliminates the need for, and concomitantly safety and security problems associated with, allowing guns aboard commercial aircraft. SAFELANDER increases safety and security by providing a safer, more humane, more effective, less costly and quicker response time in altering a deviant aircraft's flight trajectory as compared to having an armed fighter aircraft intercept and possibly shoot down the deviant aircraft.

Accordingly several objectives and advantages of the invention are to provide a means of increasing aircraft in-air safety, on-ground safety, and security. Also SAFELANDER significantly lowers the overall cost of air travel by minimizing the cost of flight security as well as aircraft cost, fuel and piloting. Still further objectives and advantages of this invention will become apparent from a study of the following description and accompanying drawings.

DRAWINGS

FIG. 1 shows the communication system. It shows how a remote pilot, operating in a secure aircraft simulator that provides a virtual reality cockpit, communicates and interfaces with an aircraft to be remotely controlled. It also shows some of the data provided both to the aircraft and to the aircraft simulator operated by the remote pilot.

FIG. 2 shows an aircraft that is fitted with a remote pilot electronic interface that permits the data seen by the aircraft's pilot to be transmitted to the ground for utilization by the remote pilot. It also shows the control system interface aboard said aircraft that permits the remote pilot simulator to transmit control signals to be received and utilized by said aircraft for the purpose of conning/steering the aircraft.

DETAILED DESCRIPTION OF THE PREFERRED EMBODIMENT

Figure 1:
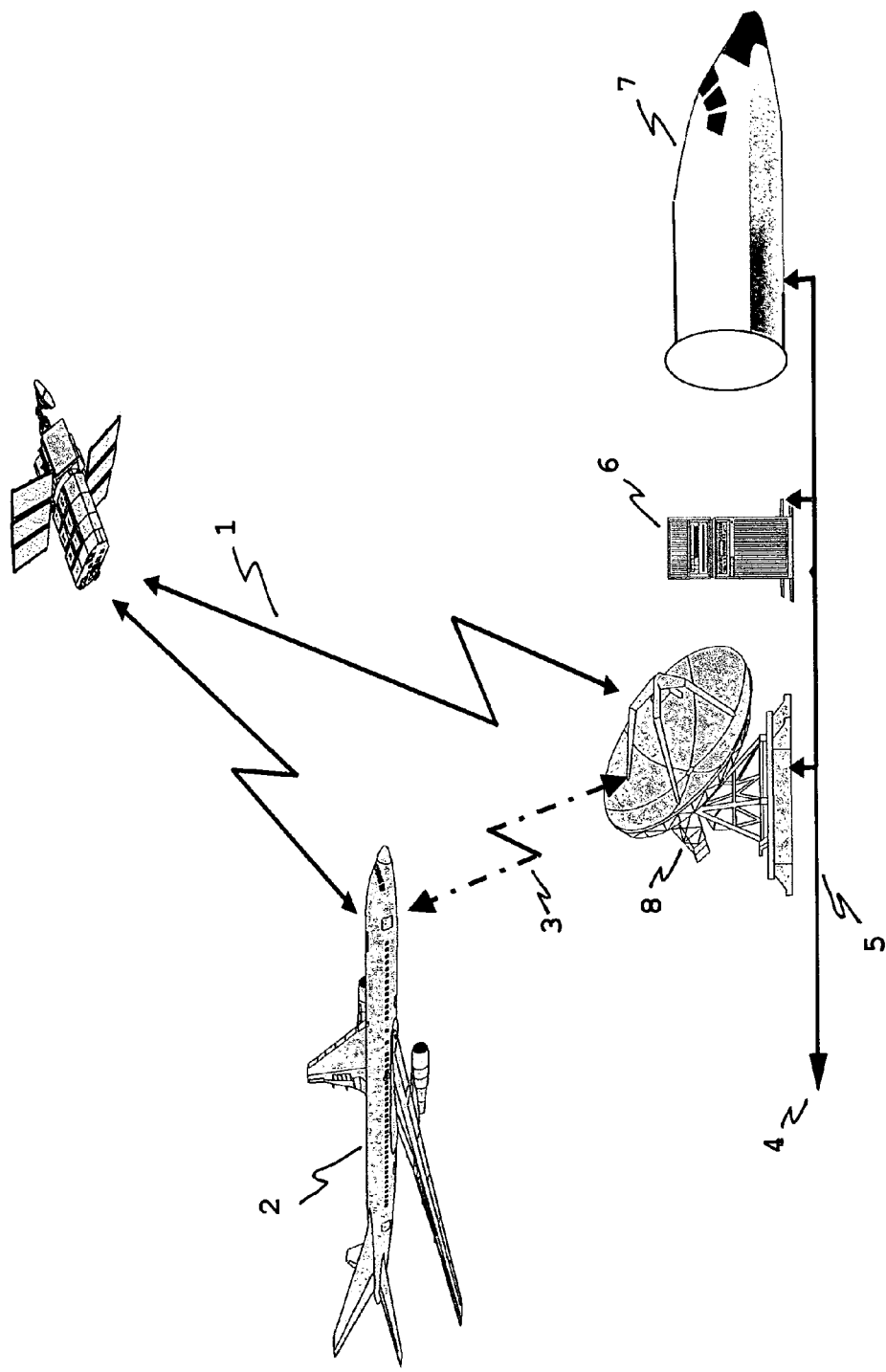

FIG. 1 shows the SAFELANDER COMMUNICATION SYSTEM. An antenna 8 transmits and receives digital data from a remote pilot in a secure aircraft simulator 7 to a global ciphered communication data link 1. The global satellite communication data link 1 transfers data from/to the remote pilot located in a secure aircraft simulator 7 to/from the aircraft 2 (which is shown as a single aircraft but is representative of a plurality of other aircraft which may be concurrently operational). The control data for piloting the aircraft are displayed in the remote pilot simulator 7 and when the remote pilot located in simulator 7 takes control of the aircraft 2 the command conning data is transmitted to the aircraft 2. In many instances, when available, there isn't a need for global data and FIG. 1 also shows a direct ciphered digital data two-way communication link 3 between the aircraft 2 and the simulator 7. Simulator processor 6 provides the extensive digital computer capability necessary to control a high fidelity, virtual reality, cockpit environment, with or without a synthetic vision display. Also simulator 7 receives the air traffic control/management data (ATC/M), and if available weather, map and terrain data and security data 4 over the secure ground ciphered two way digital data link 5. A subset of the digital data transmitted/received over Link 5 can also be transmitted/received by aircraft 2 via global ciphered communication digital data link 1. The remote pilot in simulator 7 can communicate directly with aircraft 2 via ground link 5's interface to the global communication link 1.

Figure 2:
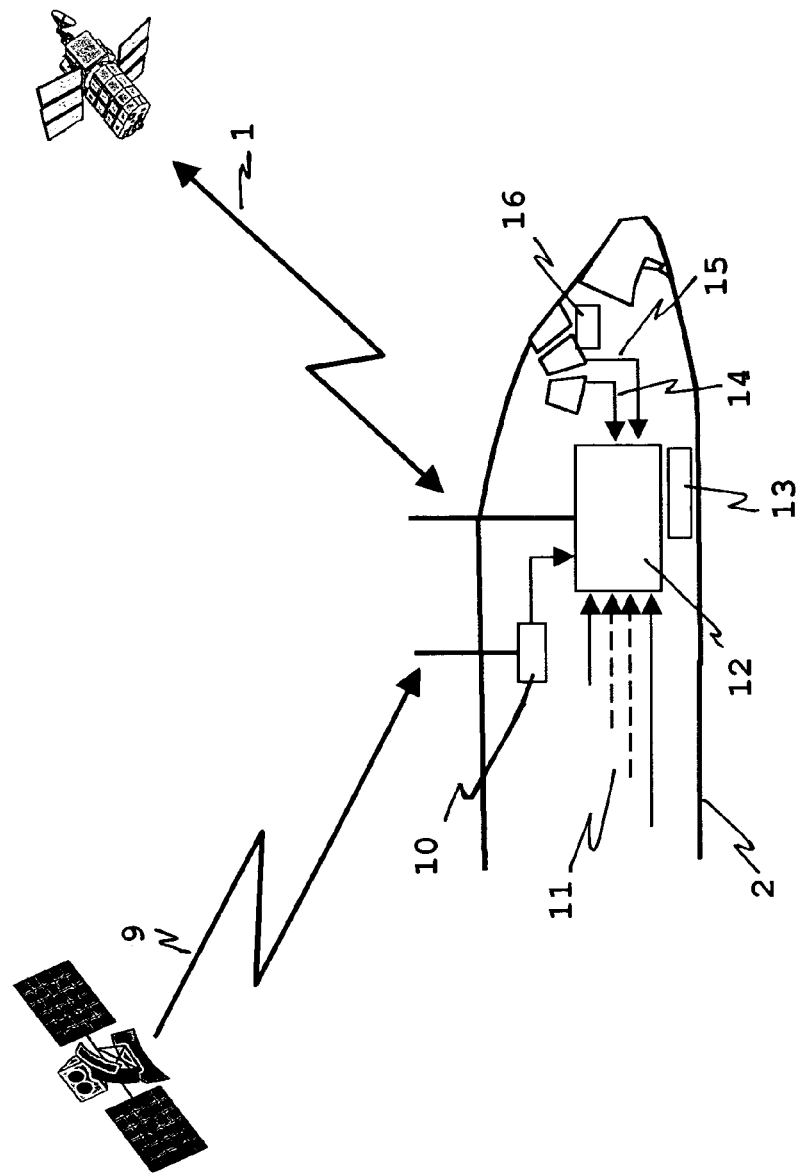

FIG. 2 shows the SAFELANDER AVIONICS SYSTEM. Aircraft 2 is fitted to receive GPS/GLONASS Satellite 9 signals. The aircraft 2 has onboard a Global Positioning System/Global Navigation Satellite System (GPS/GLONASS) Receiver 10 to accept 3-dimensional (Latitude, Longitude and Altitude) position data as well as 3-dimensional (North/South, East/West and Vertical) velocity data. Aircraft 2 also has a plurality of monitored performance and control flight signals going to the aircraft's flight control unit, instrument landing system, flight data recorders, autopilot, etc. These performance and control sensor data 11 signals are sent to a sensor multiplexer transceiver 12 for ciphered telemetry to the ground-based aircraft simulator 7. Since there exists a plurality of aircraft 2, each targeted aircraft has a unique identification (ID). The sensor multiplexer transceiver 12 of each specific/unique aircraft uses its unique ID to recognize and utilize only the information being specifically transmitted to the targeted aircraft as its designated data from the antenna 8 (in FIG. 3) of the CGBS. The sensor multiplexer transceiver 12 is described in U.S. Pat. No. 5,974,349 under the Detailed Description Of The Preferred Embodiment, FIG. 1. In U.S. Pat. No. 5,974,349 the sensor multiplexer transceiver 12 is labeled the Sensor Multiplexer Receiver and Transmitter (SMART).

When an aircraft transmits its data to the antenna 8 (in FIG. 3) of the CGBS, the sensor multiplexer transceiver 12 of the aircraft adds its unique aircraft identification (ID) to the data stream in order to enable the CGBS to parse the data stream and to recognize that it is from that specific/unique aircraft. The signals are used in the simulator 7 to duplicate aircraft 2's environment. Also shown is the Remote Pilot Electronic Interface 13 that is used to accept signals from the remote pilot in the ground-based simulator 7 in order to allow for the remote piloting of aircraft 2. It accomplishes this by interfacing with the Flight Control Unit (FCU), Instrument Landing System (ILS) and Autopilot of aircraft 2. The Remote Pilot Electronic Interface 13 aboard aircraft 2 can be thought of as a telemetered extension of the Remote Pilot Secure Aircraft Simulator 7. It takes the actual conning actions and commands given by the remote pilot located in simulator 7 for conning aircraft 2 and converts them into the actual control and conning commands of aircraft 2. The Remote Pilot Electronic Interface 13 provides the mechanism for the remote pilot to alter the trajectory and angular displacement of aircraft 2 just as if they were given by the onboard pilot. The Remote Pilot Electronic Interface 13 provides the electronic signals necessary for secondary control by the remote pilot located in simulator 7 of aircraft 2's ILS, Autopilot/Flight Director (FD), Autothrottle, Autobrake, Steering Control and Landing-Gear Control. Thus, the remote pilot simulator, by way of telemetry, is a replica of the cockpit of aircraft 2 since it displays aircraft 2's actual real-time control data via Sensor Multiplexer Transceiver 12 and can take real-time control of the trajectory, attitude, braking, throttle/trust and landing gear of aircraft 2 via the Remote Pilot Electronic Interface 13. When the remote pilot takes conning control of aircraft 2 it disables the onboard pilot's conning function. This condition stays in effect until the remote pilot decides to relinquish the conning control of aircraft 2 back to the onboard pilot. Thus, only a single pilot conns aircraft 2 at any given time.

For planes equipped with video data 14 this data is also transmitted to the ground-based simulator 7 for situation awareness. Aircraft acoustic data 15 is also transmitted from the aircraft 2 to the simulator 7. An advisory system 16 is shown situated in the cockpit of the aircraft 2 to provide both display and keyboard entry communication between the simulator 7 and the aircraft 2. Also shown in FIG. 2 is the Global Communication Link 1 for providing ciphered telemetry between the aircraft 2 and the simulator 7.

Figure 3:
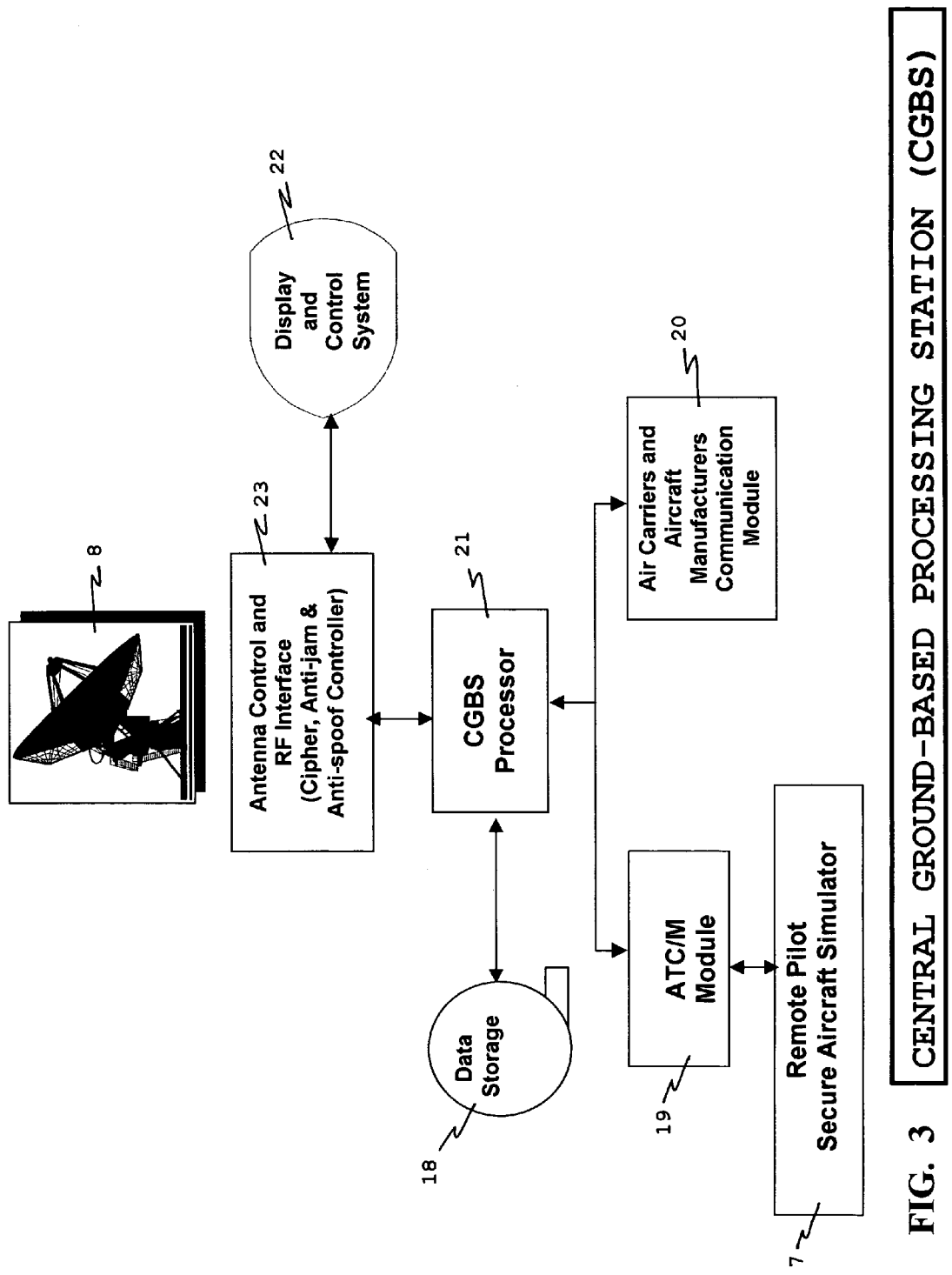
FIG. 3 shows the ground processing and ciphered, anti-jam and anti-spoof data telemetry transmission system that permits SAFELANDER to securely receive data from a plurality of sources and to transmit aircraft conning control data from an aircraft simulator for remote piloting of an Executive (small to medium sized) Aircraft, Passenger/Carrier Aircraft, Cargo Aircraft and large Military Aircraft.

FIG. 3 shows the CENTRAL GROUND-BASED PROCESSING STATION (CGBS) used for collecting and disseminating the digital data from a plurality of aircraft and aviation sources. The CGBS digitally processes such sources and then ciphers the digital data so that it can be exclusively/uniquely/solely utilized by the targeted aircraft 2. It also shows the antenna 8 utilized for transmitting and receiving radio frequency (RF) ciphered two-way digital data between the CGBS and the targeted aircraft 2. Since there exists a plurality of aircraft 2, each targeted aircraft has a unique identification (ID) that permits the CGBS to process each individual aircraft 2 as a unique vehicle. The CGBS, by adding the unique aircraft ID to its transmitted data stream, can send data to a specific/unique aircraft, or send a general message to a group of aircraft, or a global message to all aircraft. To assure the integrity, security and uniqueness of critical digital data going to and from all aircraft 2 the antenna control and RF interface 23 perform the cipher/decipher, anti-jam and anti-spoof controller functions. All of the communication both to and from the aircraft 2 and other aircraft are stored in the data storage 18 section of the CGBS for archival retrieval should that become necessary for post flight analysis. The CGBS also acts as the communication control unit for the air traffic control/management (ATC/M) module 19 data and the Air Carrier and Aircraft Manufacturers Communication Module 20. In order for the CGBS to process the large amount of digital data, communication and ciphering information a processor 21 acts as an intelligent controller. The CGBS provides visibility to the many transactions taking place at this site via a display and control system 22. The Remote Pilot Simulator 7 communicates with aircraft 2 though the ATC/M Module 19. The Remote Pilot Simulator 7 communication to/from ATC/M Module 19, with aircraft 2 includes the aircraft control parameters (e.g.: aircraft ID, 3-D position, 3-D velocity, heading, velocity, target state and target change reports—waypoints, etc.) via the secure ground digital data 5. The ATC/M. weather, map, terrain and security communication 4 from the ATC/M Module 19 is transmitted/received over the secure ground digital data link 5. The ATC/M 19 and aircraft data from a plurality of CGBS' is also distributed over the secure ground digital data link 5.

Figure 4:
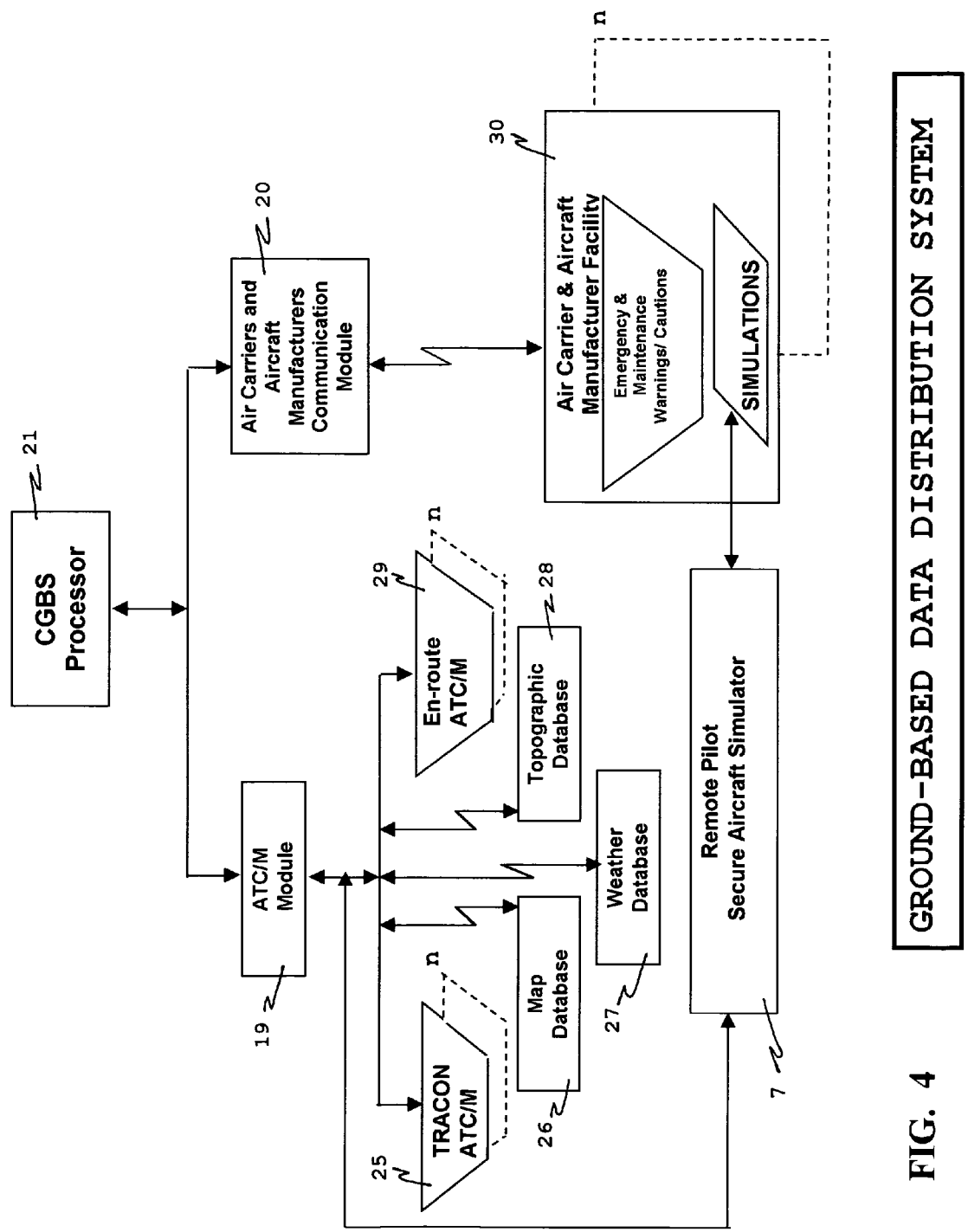
FIG. 4 shows the integration of the SAFELANDER simulator into the ground-based data distribution system of Executive (small to medium sized) Aircraft, Passenger/Carrier Aircraft, Cargo Aircraft and large Military Aircraft.

FIG. 4 shows the GROUND-BASED DATA DISTRIBUTION SYSTEM. The processor 21 integrates the Air Traffic Control/Management (ATC/M) module 19 with the Air Carrier and Aircraft Manufacturing Communication Module 20. The ATC/M module 28 assimilates Terminal Radar Approach Control (TRACON) ATC/M 25 digital data with digital Map Database 26, Weather Database 27, digital Topographic Database 28 and En-route ATC/M 29 data. The Air Carrier and Aircraft Manufacturers Communication Module 20 integrates all Air Carrier and Aircraft Emergency & Maintenance, Warnings/Cautions, Simulations 30 and the Remote Pilot Secure Aircraft Simulator 7. For training purposes, among others, the Remote Pilot Simulator 7 can also be interfaced to an aircraft manufacturer's simulator located at either the Air Carrier or Aircraft Manufacturing Facility 30. This permits the remote pilot located in the ground-based Remote Pilot Simulator 7 to undergo emergency training using data derived from an aircraft manufacturer or air carrier simulator, in place of operational aircraft data, prior to any actual aircraft problems. It permits the remote pilot a chance to practice varying emergency landing procedures and maneuvers concurrent with an in-flight aircraft, such as Aircraft 2, being on autopilot. This maybe a vital capability since many aircraft that are experiencing major problems with a landing can be operated on autopilot for a substantial portion of flight time prior to attempting to land said aircraft. This technique optimizes the success in landing an aircraft that is experiencing landing related problems.

REFERENCED NUMERALS

1 Global Satellite Two Way Ciphered Digital Data Communication Link
2 Aircraft That Can Be Remotely Controlled
3 Two way Aircraft-Ground Direct Ciphered Digital Data Communication Link
4 ATC/M, Weather, Map, Terrain & Security Data
5 Two Way Secure Ground Ciphered Digital Data Link
6 Simulator Processor
7 Remote Pilot Secure Aircraft Simulator (High Fidelity Virtual Reality Cockpit)
8 Radio Frequency (RF) Antenna
9 GPS/GLONASS Navigation Satellite
10 GPS/GLONASS Navigation Receiver
11 Aircraft Performance and Control Sensor Data
12 Sensor Multiplexer Transceiver
13 Remote Pilot Electronic Interface (FCU, ILS, Autopilot Interfaces)

14 Video Data
15 Acoustic Data
16 Advisory System
18. Data Storage
19. ATC/M Module
20. Air Carriers and Aircraft Manufacturers Communication Module
21. CGBS Processor
22. Display and Control System
23. Antenna Control and RF Interface (Cipher, Anti-jam & Anti-spoof Communication)
25. TRACON ATC/M
26. Map Database
27. Weather Database
28. Topographic Database
29. En-route ATC/M
30. Air Carrier & Aircraft Manufacturer Facility Emergency & Maintenance, Warnings/Cautions, Simulations Operation In the preferred patent embodiment of SAFELANDER, the remote pilot can perform the piloting function of an operational aircraft from a ground-based simulator 7. In order to assure that simulator 7 is operated by an authorized remote pilot, electronic identification, such as fingerprint, and/or eye, and/or face recognition, etc. are employed along with a keyboard entered access code. Simulator 7 is located in a high security site to further prevent its being utilized by unauthorized personnel or sabotaged. To assure data integrity SAFELANDER uses a cipher code that is periodically altered. This code is used for ciphering all of the telemetry data going to and from both the aircraft 2 (representative of a plurality of operational aircraft) in FIG. 1 and the CGBS FIG. 3 (representative of a plurality of CGBS). The remote pilot located in simulator 7 is a trained and licensed pilot for the designated aircraft 2 that the remote pilot is to assume the piloting function of and is also highly trained in the handling of emergency situations. The remote pilot located in simulator 7 is in a ground facility that permits direct communication with experts over the high-speed secure ground ciphered digital data links 5 to minimize injuries, fatalities and destruction.

Should aviation security or ATC/M personnel deem that an aircraft, such as aircraft 2, is deviating substantially from a safe and approved flight plan trajectory, they, via a secure ground digital data link 5, can request that the remote pilot in simulator 7 assume control of aircraft 2 and land it at a specified airfield. The airfield selected could be the initial airfield specified in the operational flight plan of aircraft 2, or may be at an airfield that is specified by security to keep the trajectory of aircraft 2 away from highly populated or strategically important edifices, and/or at an airfield where security and emergency personnel are available to intercept aircraft 2. The remote pilot located in simulator 7 may even alter the time of landing to assure that security and emergency personnel are available.

When aircraft 2 is at an airport terminal, or on a runway, the remote pilot located in simulator 7 could prevent aircraft 2 from moving or could taxi it to an isolated location in the airport that is selected to be the safest location for handling problem aircraft.

In a similar fashion most planes such as aircraft 2 are equipped with a pilot initiated emergency button that gets transmitted to the ground. On reception of this signal and with the aid of security personnel and air carrier personnel a decision could be made to have the remote pilot take control of the rogue aircraft 2. The remote pilot located in simulator 7, with the aid of security and air carrier personnel, may decide to relinquish control of aircraft 2 back to the onboard pilot of aircraft 2 should that be deemed the proper thing to do. As such, SAFELANDER offers a more humane, safer and lower cost alternative for controlling a rogue aircraft 2 than the present existing methodology (e.g.: having a large number of armed fighter aircraft, in the air and available, to shoot down an aircraft, such as aircraft 2, or having large number of armed flight crew members or security personnel available to fire ammunition onboard an in-flight aircraft, such as aircraft 2).

Another economic advantage of the invention is the reduction of the flight crew of large aircraft from a pilot and co-pilot flight crew to a single onboard pilot. Using SAFELANDER a pilot who needs a break from the piloting function could notify the remote pilot located in simulator 7. The remote pilot located in simulator 7 could then take over the piloting function until the onboard pilot is once again available. At that point the onboard pilot of aircraft 2 would transmit to the remote pilot located in simulator 7 the request to resume the piloting function of aircraft 2. The remote pilot located in simulator 7 would then enable and return the piloting capability back to the onboard pilot in aircraft 2. Most large aircraft, as opposed to fighter or small civil aircraft, presently utilize two pilots (pilot and copilot) for the aircraft piloting function. SAFELANDER can permit large aircraft to operate with only a single onboard pilot and yet provide the enhanced safety of a remote pilot located in simulator 7 who has access to advanced safety tools. Utilizing a single onboard pilot saves the wages/cost of a copilot and permits the aircraft to be fitted with just a single piloting station in the cockpit. Aircraft equipped with a single piloting station reduce aircraft weight and costly avionics. These features of the patent reduce the cost of flying while still enhancing safety and security.

SAFELANDER offers significant safety and its concomitant economic benefits over the existing large aircraft system. Many times aircraft experience dire landing problems. The pilot/pilots onboard aircraft 2 may have never experienced a problem such as what is occurring. The decision as to what represents the safest approach to handle a problem aboard an in-flight aircraft may be complex. In this case the aircraft problem could be reported to the remote pilot located in simulator 7. The remote pilot located in simulator 7 may then communicate and coordinate with the Air Carrier and Aircraft Manufacturer 30 to plan for the safest method of handling the situation. This may even amount to having the remote pilot's simulator 7 displays and indicators being driven by a simulation program originated at the air carrier and/or aircraft manufacture facility 30. Then several flight scenarios could be tried and practiced by the remote pilot located in simulator 7 to determine the safest way of handling the situation. During this process the remote pilot located in simulator 7 would be dynamically trained in the safest way to pilot aircraft 2 to a landing. Based on a caucus with the onboard pilot in aircraft 2, the air carrier, aircraft manufacturer, security personnel and ATC, it may be determined that the remote pilot located in simulator 7 should take control of the aircraft 2 for the safety of the passengers and ground personnel. It may also be determined that the remote pilot in 7 should aid the onboard aircraft pilot 2 via communication as to the safest way to handle the situation. As such, SAFELANDER will reduce the number of fatal crashes that have plagued commercial aircraft and have been traditionally assigned to "pilot error".

SAFELANDER brings the technology of safely guiding commercial and large military aircraft by remotely located pilot, operating in a high fidelity virtual reality cockpit in simulator 7, into the world of aviation. In order to accomplish this, it is necessary for the remote pilot located in simulator 7 to be interfaced with the present ATC/M module air carrier and aircraft manufacturers communication module this is shown in FIG. 4. In the virtual reality cockpit the remote pilot located in simulator 7, will experience the same environment as the pilot in aircraft 2 with the exception of feeling temperature, pressure, and the effects of gravity. SAFELANDER's simulator 7 can be made to simulate temperature, pressure and gravity effects of aircraft 2, but this invention does not include this function since the major objective is to promote the safety of aircraft 2. The remote pilot in simulator 7 can operate much more efficiently to assure the safety of aircraft 2 by not being subjected to extreme pressure, temperature and gravity disturbances. This also is one of the advantages of SAFELANDER.

Since a virtual reality cockpit that mirrors aircraft 2's cockpit communication and operation is required in order to prevent crashes, etc., it is critical to air traffic control that SAFELANDER's simulator 7 communications go through the ATC/M 19 module as shown in FIG. 3. Also, since archival retrieval of post flight data is necessary for problem identification and correction is necessary, this data memory capability is shown in the data storage 18 unit of FIG. 3. SAFELANDER provides a much more complete record of events than the present onboard flight recorder system since all data is safely stored in real-time at the CGBS FIG. 3. This can eliminate the need for retrieving onboard flight recorder data in many cases. The centralized recording capability is another economic benefit of the SAFELANDER invention.

The basic operation is that a remote pilot sitting in the SAFELANDER simulator 7 can have a virtual cockpit display of an aircraft 2 similar to what the onboard pilot of aircraft 2 experiences. This is possible since the performance and control sensor data 11 of aircraft 2 is combined in the sensor multiplexer transceiver 12 and then transmitted to the ground via the ground-air digital data link 1 to the remote pilot's simulator processor 6. The control and sensor data 11 of aircraft 2 then drives the displays and controls of the SAFELANDER virtual reality simulator 7 to duplicate the displays and controls in aircraft 2. Should the need arise for the remote pilot to take control of the piloting function of aircraft 2, this can be accomplished by sending, via telemetry, ciphered control signals through the digital data link 8 up to aircraft 2. These signals permit interface with aircraft 2 via the remote pilot electronic interface 13. Aircraft 2 is fitted with interface 13 such that upon receiving commands from the SAFELANDER's remote pilot located in simulator 7 the aircraft 2 follows the piloting directed by the remote pilot located in simulator 7 instead of the onboard pilot in aircraft 2. The remote pilot sitting in SAFELANDER simulator 7 has a high fidelity virtual reality replication of the flight control system and is now in control of aircraft 2 just as if remote pilot located in simulator 7 was sitting in and conning aircraft 2.

The remote pilot located in simulator 7 has access to the ATC/M, weather, map, terrain and security data 4 required to safely pilot the aircraft 2 and interfaces directly with the ATC/M personnel just as if he was the onboard pilot. The ATC/M personnel handle communication with the remote pilot located in simulator 7 the same way as if the remote pilot was the onboard pilot in aircraft 2. The one exception being ATC/M knows that aircraft 2 is being remotely piloted.

Should the remote pilot located in simulator 7 desire to, based on the advice of security, ATC/M, air carrier and air manufacturer personnel, relinquish control of aircraft 2 back to the onboard pilot, he can accomplish this via ciphered data transmission 1 to aircraft 2. Once the remote pilot located in simulator 7 relinquishes the control back to the onboard pilot, the onboard pilot assumes the piloting function of aircraft 2. The piloting function of aircraft 2 (which represents one of a plurality of aircraft) could be transferred back and forth between the onboard pilot in aircraft 2 and the remote pilot located in simulator 7 should that be so desired. SAFELANDER simulator 7 represents one of a plurality of simulators. The number of SAFELANDER simulators 7 is only a very small fraction of the number of operational aircraft similar to aircraft 2. The communication link 1 cited in the preferred embodiment of the patent provides for a global capability but can also be limited to local or country coverage (ciphered digital data communication link 3).

SAFELANDER allows a remote pilot to control the piloting function of several in-air aircraft by selecting a safe trajectory for each aircraft; then putting them on autopilot. Once that is accomplished, the remote pilot can select, directly control, fly and land each individual aircraft sequentially.

In conclusion, no other aircraft remote pilot capability formerly developed or patented provides the necessary safeguards and capabilities to allow the dynamic transfer of the piloting function between the onboard pilot(s) and the ground-based remote pilot(s) for the control of Executive (small to medium sized) Aircraft, Passenger/Carrier Aircraft, Cargo Aircraft and large Military Aircraft. SAFELANDER, by virtue of claims 1 though 15, permits the above aircraft to be operated remotely and safely in highly congested airspace and to minimize the loss of life and property damage that can result from aircraft which deviate from an air traffic control approved flight plan. It also permits the above aircraft, by virtue of claims 28 through 30, to be safely piloted by only a single onboard pilot. Thus, SAFELANDER enhances aviation safety and national security while it substantially reduces the cost of flying along with the concomitant costs associated with providing national security.

What is claimed is:

1. A remote piloting system configured for an onboard, manned piloted aircraft comprising:
 a) an operational aircraft or a plurality of operational aircraft with equipment to interface with a ground-based aircraft simulator;
 b) a ground-based aircraft simulator or a plurality of ground-based simulators, that dynamically mimics the displays and controls of operational aircraft and configured for a pilot in the simulator to remotely take over the piloting function of operational aircraft;
 c) a sensor multiplexer receiver and transmitter means located onboard aircraft for accepting said aircraft performance and control parameters that are required by a ground-based simulator to replicate the major control and performance states of aircraft, and then, when necessary, convert said performance and control parameters into digital format, add a unique aircraft identification, ID, to an outgoing radio frequency, RF, signal and broadcasting said outgoing RF signal to a Central Ground-Based processing Station (CGBS) which then transfers the aircraft performance and control data to a ground-based aircraft simulator;
 d) a ground-based aircraft simulator digital processor/computer that is configured to provide the computational and conversion capability to dynamically reproduce displays that exist in the operational aircraft onto the displays in the simulator and converts the remote piloting controls of the ground-based simulator for conning/guiding operational aircraft;

e) remote pilot control avionics that permit a pilot sitting in the ground-based aircraft simulator to control the piloting of an operational aircraft;

f) a ground-based aircraft simulator Flight Control Unit (FCU), and/or any combination of the following:
 1. ILS,
 2. Autopilot/Flight Director (FD),
 3. Autothrottle,
 4. Autobrake,
 5. Thrust Control,
 6. Steering Control, and
 7. Landing-gear Control
 configured to bring operational aircraft to a safe landing and stopped by the remote pilot;

g) a remote pilot electronic interface unit located on aircraft that recognizes that the remote pilot aircraft simulator has uniquely specified and selected aircraft, from a plurality of operational aircraft, based on the electronic interface unit recognizing the operational aircraft's unique ID, as the vehicle to be remotely piloted;

h) a remote pilot electronic interface unit that provides the interfaces to control the aircraft's FCU and/or any combination of the following:
 1. ILS,
 2. Autopilot/Flight Director (FD),
 3. Autothrottle,
 4. Autobrake,
 5. Thrust Control,
 6. Steering Control, and
 7. Landing-gear Control
 configured to bring operational aircraft to a safe landing and stopped by the remote pilot;

i) a ground-based aircraft simulator that via ground to air telemetry, directed through the CGBS, with operational aircraft and electronic interfaces provides the electronic signals that control operational aircraft's FCU and/or any combination of the following:
 1. ILS,
 2. Autopilot/Flight Director (FD),
 3. Autothrottle,
 4. Autobrake,
 5. Thrust Control,
 6. Steering Control, and
 7. Landing-gear Control
 configured to bring operational aircraft to a safe landing at a remote pilot designated airfield and stopped;

j) a unique aircraft identification, ID, and configuration system which permits two-way RF communication between a ground-based aircraft simulator and a specific operational aircraft that is functioning among a plurality of operational aircraft;

k) a parsing system in the CGBS based on aircraft's unique ID that allows information going to the CGBS to be parsed so that aircraft is uniquely identified from a plurality of operational aircraft and utilized in the remote pilot simulator;

l) a ground to air and air to ground two-way RF communication system that allows unique communication between specified operational aircraft and a ground-based aircraft simulator based on the unique ID (j) of operational aircraft; and m) a remote pilot's display, located in the ground-based simulator, that dynamically mimics the critical conning displays of operational aircraft.

2. A remote pilot system, as in claim 1, in which a ground-based simulator has voice and/or digital data communication with air traffic control/management (ATC/M).

3. A remote pilot system, as in claim 1, equipped with an aircraft display and control advisory system located onboard the operational aircraft in which the:

a) operational aircraft onboard pilot notifies, via telecommunication, the remote pilot located in the ground-based simulator, of the onboard pilot's desire for the remote pilot to assume the piloting function of the operational aircraft;

b) remote pilot located in a ground-based simulator notifies, via telecommunication, the operational aircraft onboard pilot that the remote pilot has taken the piloting function over and that the operational aircraft piloting function is now under the control of the remote pilot;

c) remote pilot in the ground-based simulator notifies, via telecommunication, the onboard pilot in the operational aircraft that the piloting function of the operational aircraft will be delegated back to the onboard pilot at a designated time; and d) operational aircraft onboard pilot notifies, via telecommunications, the remote pilot in the ground-based simulator of the onboard pilot's desire to assume the piloting function of the operational aircraft.

4. A remote pilot system, as in claim 1, equipped with an aircraft display and control advisory system located onboard the operational aircraft in which the operational aircraft onboard pilot, using a coded message for a terrorist notifies, via telecommunication, the remote pilot located in the ground-based simulator to immediately assume the piloting function of the operational aircraft.

5. A remote pilot system, as in claim 1, equipped with an aircraft display and control advisory system located onboard the operational aircraft in which the operational aircraft onboard pilot using a coded message for a dire aircraft problem notifies, via telecommunication, the remote pilot located in the ground-based simulator to immediately assume the piloting function of the operational aircraft.

6. A remote pilot system, as in claim 1, equipped with a remote pilot display and control advisory system located in the remote pilot simulator in which the:

a) operational aircraft onboard pilot notifies, via telecommunication, the remote pilot in the ground-based simulator of the onboard pilot's desire for the remote pilot to assume the piloting function of the operational aircraft;

b) remote pilot in the ground-based simulator notifies, via telecommunication, the operational aircraft onboard pilot that the remote pilot has taken the piloting function over and that the operational aircraft piloting is now under the control of the remote pilot;

c) remote pilot in the ground-based simulator notifies, via telecommunication, the operational aircraft onboard pilot that the piloting function of the operational aircraft will be delegated back to the onboard pilot at a specified time; and d) operational aircraft onboard pilot notifies, via telecommunication, the remote pilot in the ground-based simulator of the onboard pilot's desire to assume the piloting function of the operational aircraft.

7. A remote pilot system, as in claim 1, in which an air traffic control/management (ATC/M), weather, map, terrain, security and airline communication system allows the remote pilot's simulator to reproduce the communication, data and displays available in the operational aircraft in claim 1.

8. A remote pilot system, as in claim 1, in which the remote pilot in the simulator has the ability to communicate directly via a ground-based digital data link with ATC/M, a weather source, a map source, a terrain source, security, airline and aircraft manufacturer.

9. A remote pilot system, as in claim 1, in which the RF digital two-way (to and from) communication system between the remote pilot and the operational aircraft is a regional digital data link (less than 1000 miles).

10. A remote pilot system, as in claim 1, in which:
   a) RF digital two-way (to and from) communication system between the remote pilot and the operational aircraft is a nationwide digital data link; and
   b) communication system has a minimum of a 500 mile extension beyond national borders.

11. A remote pilot system, as in claim 1, in which:
   a) RF digital two-way (to and from) communication system between the remote pilot and the operational aircraft is a global digital data link; and
   b) communication system consists of an in atmosphere RF communication, as via a global satellite data link or ground to aircraft directly, or a combination of atmospheric RF communication and a ground digital data link consisting of optical fiber and wire digital data transmission.

12. A remote pilot system, as in claim 1, in which the ground-based remote pilot simulator for emergency mitigation, development and training purposes interfaces directly with the operational aircraft and/or an air carrier or aircraft manufacturer's simulation capability such that it artificially produces a computer generated aircraft piloting environment.

13. A remote pilot system, as in claim 1, in which the ground to air RF communication system allows simultaneous communication of emergency or warning messages from the remote pilot simulator to all operational aircraft.

14. A remote pilot system, as in claim 1, in which both the RF communication and the ground communication are secure and can have either one of, or any combination of, the following:
   a) a ciphered communication system that allows for periodically changing the code to be utilized in the communication system;
   b) an anti-spoof communication system that reasonably prevents data from being misinterpreted; and
   c) an anti-jam communication system that reasonably prevents the data communication from being intentionally jammed or jammed by naturally occurring RF noise/interference signals.

15. A remote pilot system, as in claim 1, supplemented with:
   a) a remote pilot simulator that simulates the control of the aircraft's control surfaces (ailerons, flaps, spoilers, rudder, etc.), thrust controls, landing-gear controls, steering, braking controls, etc. so as to permit the remote pilot, via telemetry to the aircraft, to take manual control of the aircraft just as if the remote pilot was the onboard pilot; and
   b) an operational aircraft interface which includes control surfaces (ailerons, flaps, spoilers, rudder, etc.), thrust controls, landing-gear controls, steering, braking controls, etc., that permits the signals coming from the remote pilot, via telemetry to the aircraft, to be manually controlled by the remote pilot both on the ground for taxiing as well as during flight.

16. A remote pilot system, as in claim 1, configured with a high fidelity synthetic vision remote pilot simulator windshield display, or windshield wraparound display, or goggles/glasses with a resolution and refresh rate to accurately and dynamically depict, in real-time, digitized map data, or terrain data or topographic data, or elevation data, or airport ground traffic data, or in-air traffic data or any combination of said data items.

17. A remote pilot system, as in claim 1, where the digital processor/computer program is arranged to accurately and dynamically depict, in real-time, digitized map data, or terrain data, or topographic data, or elevation data, or airport ground traffic data, or in-air traffic data or any combination of said data items.

18. A remote pilot system, as in claim 1, in which:
   a) remote pilot can command an in-flight operational aircraft to be put on autopilot;
   b) commanded aircraft will retain the last remote pilot's command, memorize it and stay on the remote pilot's designated trajectory until it receives another remote pilot command to alter the designated trajectory;
   c) remote pilot can concurrently and/or consecutively command a plurality of aircraft to varying trajectories by putting each unique ID aircraft on autopilot;
   d) remote pilot can individually take control of a unique ID operational aircraft that is on autopilot, while the other aircrafts remain on autopilot, and then assume the piloting function of that unique operational aircraft in order to land it; and
   e) remote pilot can individually and sequentially repeat the landing process for each unique ID operational aircraft, from the plurality of operational aircraft, until each unique ID aircraft has been landed.

19. A remote pilot system, as in claim 1, in which the remote pilot simulator with any combination of the following:
   a) has a simulation of the aircrafts' Mode Control Panel/Flight Control Unit and/or Control Display Unit to transfer data to Autopilot/Flight Director(FD), Autothrottle, etc.;
   b) electronically assimilates the Target State (TS) Report and/or Trajectory Change (TC) for transfer to ATC/M; and
   c) electronically transfers the Minimum Aviation System Performance Standards for Automatic Dependent Surveillance Broadcast (ADS-B) to ATC/M.

20. A remote pilot system, as in claim 1, in which the simulator provides a dual piloting control function that allows the simulator to be manned and controlled by either a remote pilot and/or remote copilot.

21. A remote pilot system, as in claim 1, arranged to save communication system bandwidth by having an operational aircraft commence transmitting its unique aircraft identification (ID) and performance and control sensor data to a central ground-based processing station only when the onboard pilot or the remote pilot notifies the other party of the commencing data transmission.

22. A remote pilot system, as in claim 1 in which there are a plurality of remote pilot simulators capable of concurrently taking over the piloting of a specific number of operational aircraft.

23. A remote pilot system, as in claim 1, for Executive (small to medium sized) Aircraft, Passenger/Carrier Aircraft, Cargo Aircraft and large Military Aircraft, in which the operational aircraft is designed or modified to have only one pilot seat.

24. A remote pilot system, as in claim 1, for Executive (small to medium sized) Aircraft, Passenger/Carrier Aircraft, Cargo Aircraft and large Military Aircraft, in which the operational aircraft is designed or modified to have only one set of pilot control avionics.

25. A remote pilot system as in claim 1, for Executive (small to medium sized) Aircraft, Passenger/Carrier Aircraft, Cargo Aircraft and large Military Aircraft, in which the operational aircraft displays and controls are reduced from a dual pilot system to one set of pilot displays and controls.

26. A remote pilot system, as in claim 1, supplemented with a remote pilot command via telemetry to a specified stationary aircraft sitting on an airport tarmac that effectively shuts down and/or prevents an aircraft's engines from being turned on.

27. A remote pilot system, as in claim 23, where the remote pilot effectively shuts down and/or prevents an aircraft's engines from being turned on for a plurality of aircraft at an airport or airports.

28. A remote pilot system, as in claim 1, where the remote pilot must enter a unique pilot's identification code via a keyboard to operate the high fidelity virtual reality simulator.

29. A remote pilot system, as in claim 1, where the simulator must recognize an authorized pilot's unique fingerprint, and/or voice print, and/or facial characteristics and/or eye characteristics to operate the high fidelity virtual reality simulator.

30. A remote pilot system, as in claim 1, where the high fidelity virtual reality simulator is located in a high security site that limits access to only authorized personnel.

31. A remote pilot system, as in claim 1, where the cipher code of claim 14, utilized for two-way communication, ground to aircraft and aircraft to ground, can be periodically altered by the remote pilot.

32. A remote pilot system, as in claim 1, where a preflight check out mode is installed such that the onboard pilot can assure that the remote piloting mode is operational and functional by checking the aircraft's response to commands.

33. A remote pilot system, as in claim 1, where an in-flight check out mode is installed such that the onboard pilot can assure that the remote piloting mode is operational and functional by checking the aircraft's response to commands.

34. A remote pilot system, as in claim 1, where a preflight check out mode is installed such that the remote pilot can assure that the remote piloting mode is operational and functional by checking the aircraft's response to commands.

35. A remote pilot system, as in claim 1, where an in-flight check out mode is installed such that the remote pilot can assure that the remote piloting mode is operational and functional by checking the aircraft's response to commands.

36. A remote pilot system, as in claim 1, where in order to save RF bandwidth, the aircraft(s) performance and control parameters necessary for remote control of aircraft(s) that get continuously transmitted to the ground, are limited to only the unique aircraft identification (ID) and performance and control parameters required by ATC/M to track the aircraft's trajectory until either the onboard pilot notifies the remote pilot of the onboard pilot's desire for the remote pilot to assume the piloting function of the aircraft, or the remote pilot notifies the onboard pilot that the remote pilot will be assuming the piloting function of the aircraft, or the onboard pilot notifies ATC/M of an emergency aboard the aircraft.

* * * * *

UNITED STATES PATENT AND TRADEMARK OFFICE
CERTIFICATE OF CORRECTION

| | | |
|---|---|---|
| PATENT NO. | : 7,099,752 B1 | Page 1 of 1 |
| APPLICATION NO. | : 10/822271 | |
| DATED | : August 29, 2006 | |
| INVENTOR(S) | : Leslie Jae Lenell and Seymour Levine | |

It is certified that error appears in the above-identified patent and that said Letters Patent is hereby corrected as shown below:

The following two corrections should be made to correct Patent 7099752, Aug 29, 2006

Correction: In Column 10 line 37 delete: "28 through 30" and insert:
"23 through 25"

In Column 10, after line 42 insert:

"It is obvious that minor changes may be made in the form and construction of the invention without departing from the material spirit thereof. It is not, however, desired to confine the invention to the exact form herein shown and described, but it is desired to include all such as properly come within the scope claimed."

Signed and Sealed this

Twenty-first Day of November, 2006

JON W. DUDAS
*Director of the United States Patent and Trademark Office*